US012619883B2

(12) United States Patent
Singla et al.

(10) Patent No.: US 12,619,883 B2
(45) Date of Patent: May 5, 2026

(54) SYSTEMS AND METHODS FOR DETERMINING TIME-SERIES FEATURE IMPORTANCE OF A MODEL

(71) Applicant: Verizon Patent and Licensing Inc., Basking Ridge, NJ (US)

(72) Inventors: Kushal Singla, Bangalore (IN); Subham Biswas, Maharashtra (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1169 days.

(21) Appl. No.: 17/559,396

(22) Filed: Dec. 22, 2021

(65) Prior Publication Data

US 2023/0196131 A1 Jun. 22, 2023

(51) Int. Cl.
| | |
|---|---|
| *G06N 5/022* | (2023.01) |
| *H04W 16/22* | (2009.01) |
| *H04W 16/28* | (2009.01) |

(52) U.S. Cl.
CPC ............ *G06N 5/022* (2013.01); *H04W 16/22* (2013.01); *H04W 16/28* (2013.01)

(58) Field of Classification Search
CPC .................................................... G06N 5/022
See application file for complete search history.

(56) References Cited

U.S. PATENT DOCUMENTS

| | | | |
|---|---|---|---|
| 11,729,636 B1 * | 8/2023 | Ahmed | G06N 20/00 370/254 |
| 2021/0258834 A1 * | 8/2021 | Pastuszak | H04W 36/0016 |
| 2023/0115093 A1 * | 4/2023 | Zhou | G06N 5/04 706/12 |
| 2023/0308199 A1 * | 9/2023 | Svennebring | H04B 17/3913 |
| 2024/0296382 A1 * | 9/2024 | Wang | G06N 5/022 |

OTHER PUBLICATIONS

Christian Berg, "The Complete Guide to Time Series Data", Nov. 3, 2021, p. 4, 8-9, and 20-21 (Year: 2021).*
Rohan Anil et al., "Large Scale Distributed Neural Network Training Through Online Distillation", Aug. 20, 2020 (Year: 2020).*
Xinyu Wang et al. "BSENet: a Data-Driven Spatio-Temporal Representation Learning for Base Station Embedding", Mar. 13, 2020 (Year: 2020).*

* cited by examiner

*Primary Examiner* — Kakali Chaki
*Assistant Examiner* — Tyler Edward Iles

(57) ABSTRACT

A system described herein may receive a set of outputs of a first model, which have been generated by the first model based on a set of inputs, and identify a set of historical values that correspond to the set of inputs and the set of outputs. The inputs and the historical values may be associated with the same time series. The system may train a second model based on the set of inputs to the first model, the set of outputs of the first model, and the set of historical values that correspond to the set of inputs and the set of outputs. The system may determine, based on training the second model, a set of weights associated with the set of historical values; and refine the first model based on the set of weights associated with the set of historical value.

20 Claims, 10 Drawing Sheets

| Model output 105 | Features and weights | | | | | | T-1 actual value 207-1 | T-1 actual value weight | T-2 actual value 207-2 | T-2 actual value weight | T-3 actual value 207-3 | T-3 actual value weight |
| | F1 | F1 weight | F2 | F2 weight | F3 | F3 weight | | | | | | |
| P4 | F1_D | WF1 | F2_D | WF2 | F3_D | WF3 | A3 | WT1 | A2 | WT2 | A1 | WT3 |
| P5 | F1_E | | F2_E | | F3_E | | A4 | | A3 | | A2 | |
| P6 | F1_F | | F2_F | | F3_F | | A4 | | A4 | | A3 | |

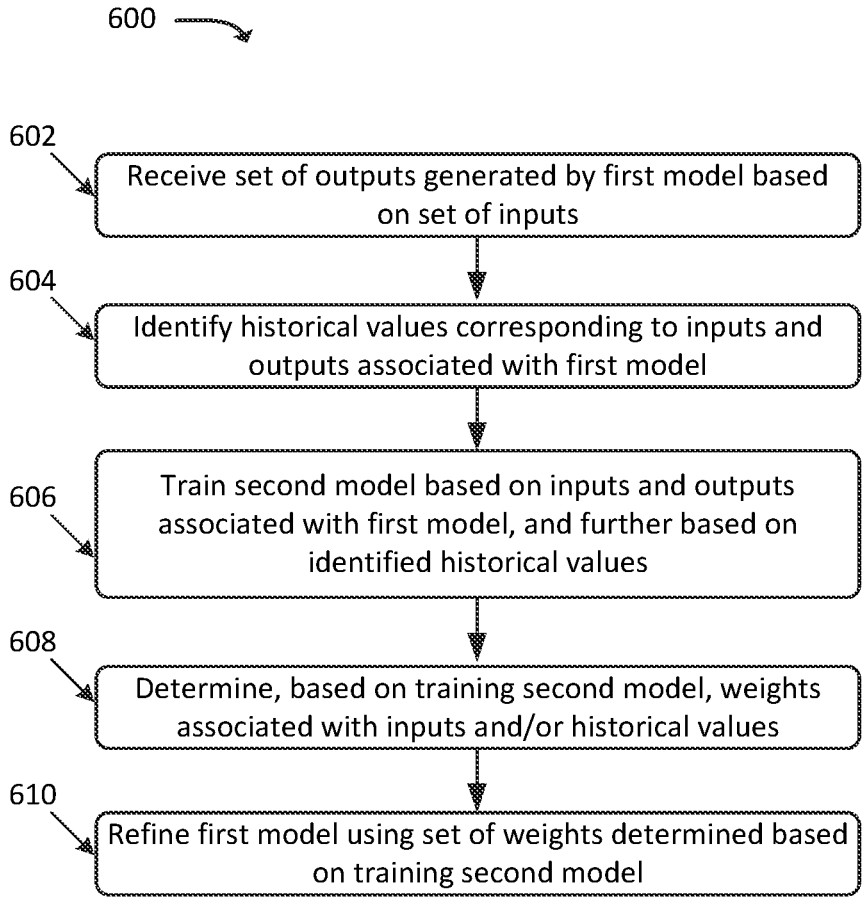

600

602 — Receive set of outputs generated by first model based on set of inputs

604 — Identify historical values corresponding to inputs and outputs associated with first model 606 — Train second model based on inputs and outputs associated with first model, and further based on identified historical values 608 — Determine, based on training second model, weights associated with inputs and/or historical values 610 — Refine first model using set of weights determined based on training second model

SYSTEMS AND METHODS FOR DETERMINING TIME-SERIES FEATURE IMPORTANCE OF A MODEL

BACKGROUND

Systems may utilize models, such as machine learning models, to aid in the performance of various functions such as pattern recognition, analysis of real-world data, automated network remediation, etc. Some models may be refined through training or some other suitable process, in which configuration parameters of the models (e.g., weights for certain features) are modified.

BRIEF DESCRIPTION OF THE DRAWINGS

FIG. 4 illustrates an example set of weights that may be determined with respect to a set of output-keyed features associated with a model, in accordance with some embodiments;

FIG. 6 illustrates an example process for refining a model based on identifying weights associated with a time series of historical data associated with a set of inputs to the model, in accordance with some embodiments;

DETAILED DESCRIPTION OF EXAMPLE EMBODIMENTS

The following detailed description refers to the accompanying drawings. The same reference numbers in different drawings may identify the same or similar elements.

Embodiments described herein provide for the determination of feature importance weights associated with one or more models. In some situations, such models may be associated with private or otherwise unascertainable feature importance weights, such as models that are generated, modified, provided, etc. by one or more entities that make the inner workings of the model (e.g., the feature importance weights and/or other attributes or parameters of the model) private or otherwise not unascertainable. As such, the models may become more explainable, and the predictive ability of the models may be able to be better quantified. Further, embodiments herein may identify historical actual data (e.g., a "ground truth" time series of actual values, as compared to outputs of the models) as a feature based on which the performance of the model may be refined. In this sense, the model may be augmented, enhanced, etc. to take elements of time into account when generating outputs, thus enhancing the accuracy, predictive ability, etc. of the model.

Models that are enhanced, refined, etc. according to embodiments described herein may be used in the automated operations of real-world systems, such as wireless networks, autonomous vehicles, smart homes, etc. For example, a particular model may determine a prediction of a set of performance metrics, wireless coverage areas, etc. associated with a wireless network (or a portion thereof, such as a cell, a base station, a sector, etc.) based on a set of input parameters such as locations of base stations of the wireless network, beamforming parameters of one or more antennas associated with the wireless network (e.g., azimuth angle, beam transmit power, beam width, etc.), quantities of connected User Equipment ("UEs"), etc. Such predictions may be used to modify parameters of the wireless network in order to increase one or more measures of yield, such as actual performance metrics experienced by UEs connected to the wireless network. For example, a particular model may generate parameters for the wireless network, such as beamforming parameters (e.g., modifications to azimuth angle, beam transmit power, beam width, etc.) based on a set of input parameters. As discussed herein, time series-related information (e.g., historical actual values), which may not necessarily be accounted for by such models, may further be used to enhance such models, such that such models are further able to utilize historical actual values in predicting attributes or metrics associated with the wireless network, and are further able to perform one or more actions (e.g., modifications to network parameters) based on such predicted attributes or metrics.

Figure 1A:
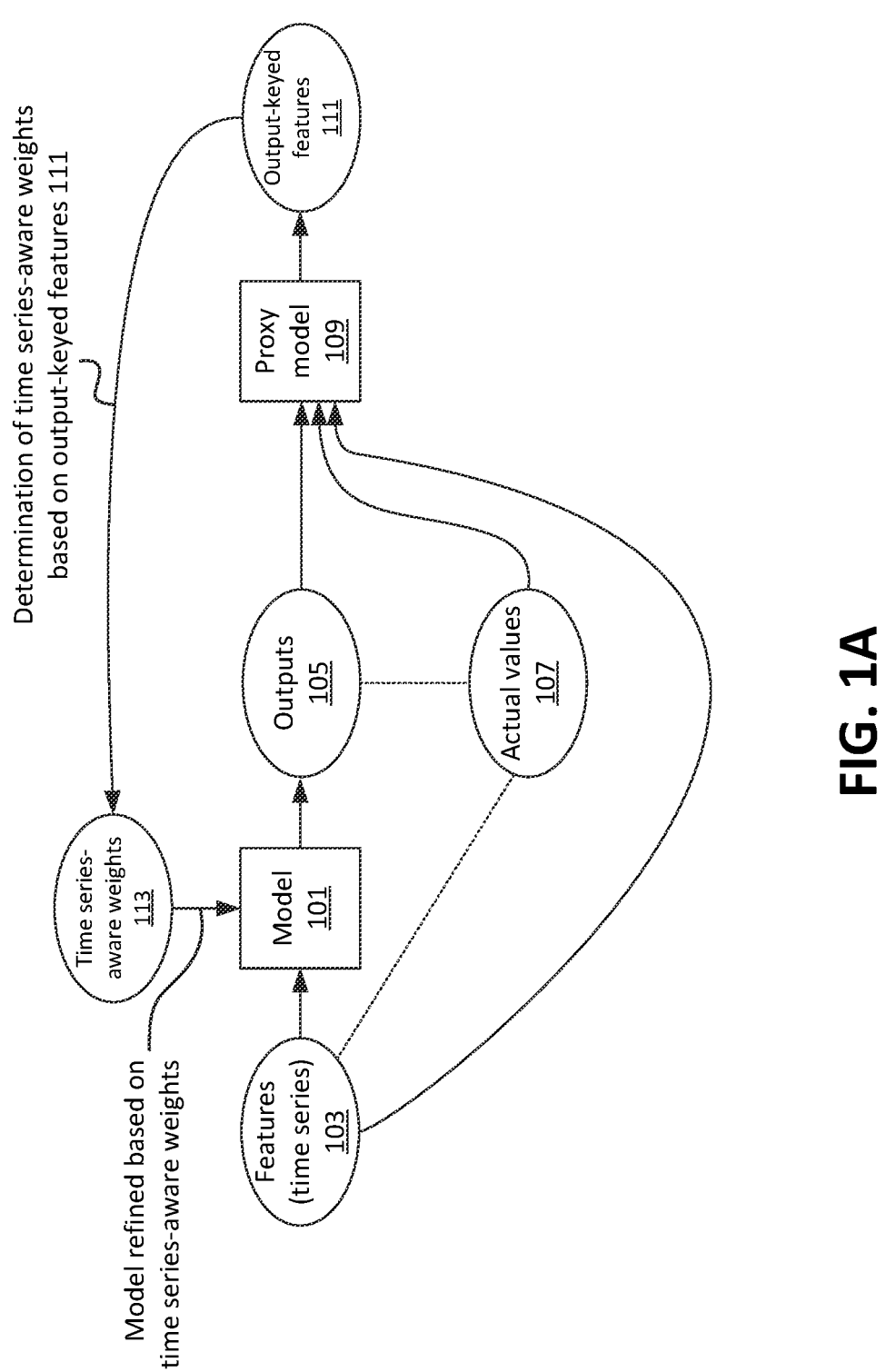
FIGS. 1A and 1B illustrate an example overview of one or more embodiments described herein.

As shown in FIG. 1A, for example, model 101 may receive, as input, a set of features 103. Model 101 may be, for example, a predictive model, an artificial intelligence/ machine learning ("AI/ML") model, a statistical model, and/or other type of model that generates or otherwise provides one or more outputs 105 based on one or more sets of inputs (e.g., features 103, in this example). In some embodiments, model 101 may be or may include an ARIMAX model, a SARIMAX model, and/or some other suitable type of model. In some embodiments, the set of features 103 may include data associated with a time series, such as sets of sensor readings collected (e.g., by an Internet of Things ("IoT") device or other type of device) at particular intervals, sets of radio frequency ("RF") metrics reported by one or more User Equipment UEs associated with a wireless network at particular intervals, annual sales of one or more items (e.g., the same item or different items), and/or other suitable types of data associated with respective time series. Features 103 may include real-world data (e.g., phenomena, readings, measurements, etc. that have been collected, measured, sensed, etc. by one or more devices) and/or may include simulated data (e.g., generated by one or more suitable simulation environments or systems).

Model 101 may accordingly determine one or more associations, correlations, affinities, measures of likelihood, etc. between particular sets of features 103 and particular sets of outputs 105. Outputs 105 may, in some situations, include estimated or predicted values that may differ from actual values 107. For example, given a particular set of features 103, such as a particular set of Light Detection and Ranging ("LIDAR") readings associated with an autonomous vehicle, model 101 may generate output 105 indicating that a pedestrian was detected within a particular distance of the vehicle. However, an actual value 107 associated with the particular set of LIDAR readings (e.g., associated with the same vehicle at the same time as the LIDAR readings were sensed) may indicate that a pedestrian was present at a different distance from the vehicle than determined by model 101, and/or that no pedestrians were present within a threshold distance of the vehicle. In this sense, actual values 107 may be a "ground truth" associated with features 103, and may in some situations be different from outputs 105 generated based on the same features 103.

In some embodiments, features 103, outputs 105, and actual values 107 may be associated with the same time series. For example, the values, features, etc. of inputs to model 101 may be associated with or otherwise correspond to the same times, intervals, etc. as outputs 105 from model 101, and also may be associated with or otherwise correspond to the same times, intervals, etc. as actual values 107. Features 103 may be exogenous variables with respect to model 101, and actual values 107 may be endogenous variables with respect to model 101.

In accordance with some embodiments, features 103, outputs 105 of model 101, and actual values 107 associated with features 103 may be provided as inputs to proxy model 109. As described in more detail below, proxy model 109 may be trained based on features 103, outputs 105, and actual values 107 in order to generate a set of output-keyed features 111. In some embodiments, proxy model 109 may be or may include a regression model. Output-keyed features 111, as described in more detail below, may be used to identify a set of time-series aware weights 113. Time-series aware weights 113 may include a set of weights, as applied to one or more features 103 and/or actual values 107 by proxy model 109, to generate output values that include, predict, match, etc. outputs 105 of model 101. Thus, the training of proxy model 109 may include determining time-series aware weights 113 that, when applied to features 103 and/or actual values 107, yield output data that matches (e.g., within a threshold measure of similarity) the output 105 of model 101.

Model 101 may, in some embodiments, be refined based on time series-aware weights 113. For example, in situations where weights of features 103 is identified as having lower impact on values of outputs 105 than historical actual values 107, model 101 may be modified to utilize such actual values 107 to determine outputs 105. As such, in accordance with embodiments described herein, the relationships of actual values 107 over time to features 103 may themselves be a feature based on which proxy model 109 is trained and/or based on which model 101 may be refined.

Further, as discussed below, time-series aware weights 113 may be used to identify anomalies, such as time series-related patterns that may not necessarily be accounted for by model 101. For example, output-keyed features 111 of proxy model 109 may indicate a relatively higher relationship between actual values 107 and time series-related patterns (e.g., seasonality, day of week, etc.) than between actual values 107 and features 103. In this manner, the reliability of model 101 may be determined, and/or measures of error with respect to model 101 may be identified with respect to time series-related patterns. In some embodiments, model 101 may be modified to account for such time series-related patterns, thus improving the accuracy and/or the predictive ability of model 101.

Figure 1B:
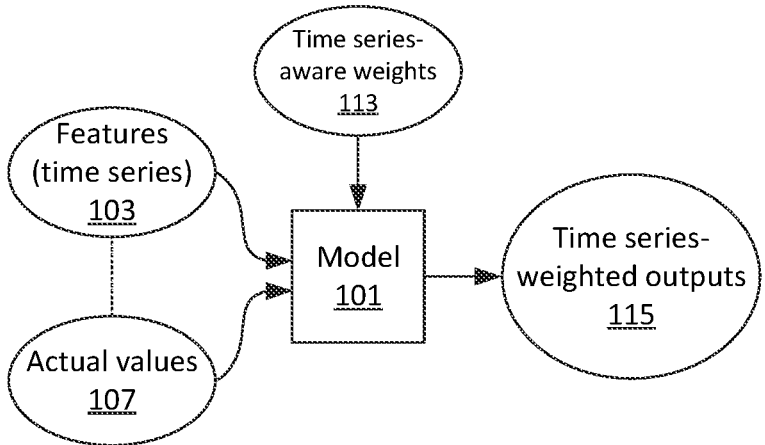

For example, time-series aware weights 113 may include weights indicating the relationships between historical actual values 107, features 103, and outputs 105. In this manner, as shown in FIG. 1B, time-series aware weights 113 may further be used to indicate a degree to which model 101 uses features 103 in order to generate time series-weighted outputs 115. For example, time series-weighted outputs 115 may be generated by model 101, as refined based on time series-aware weights, based on inputs that include features 103 and a set of historical actual values 107.

Figure 2:
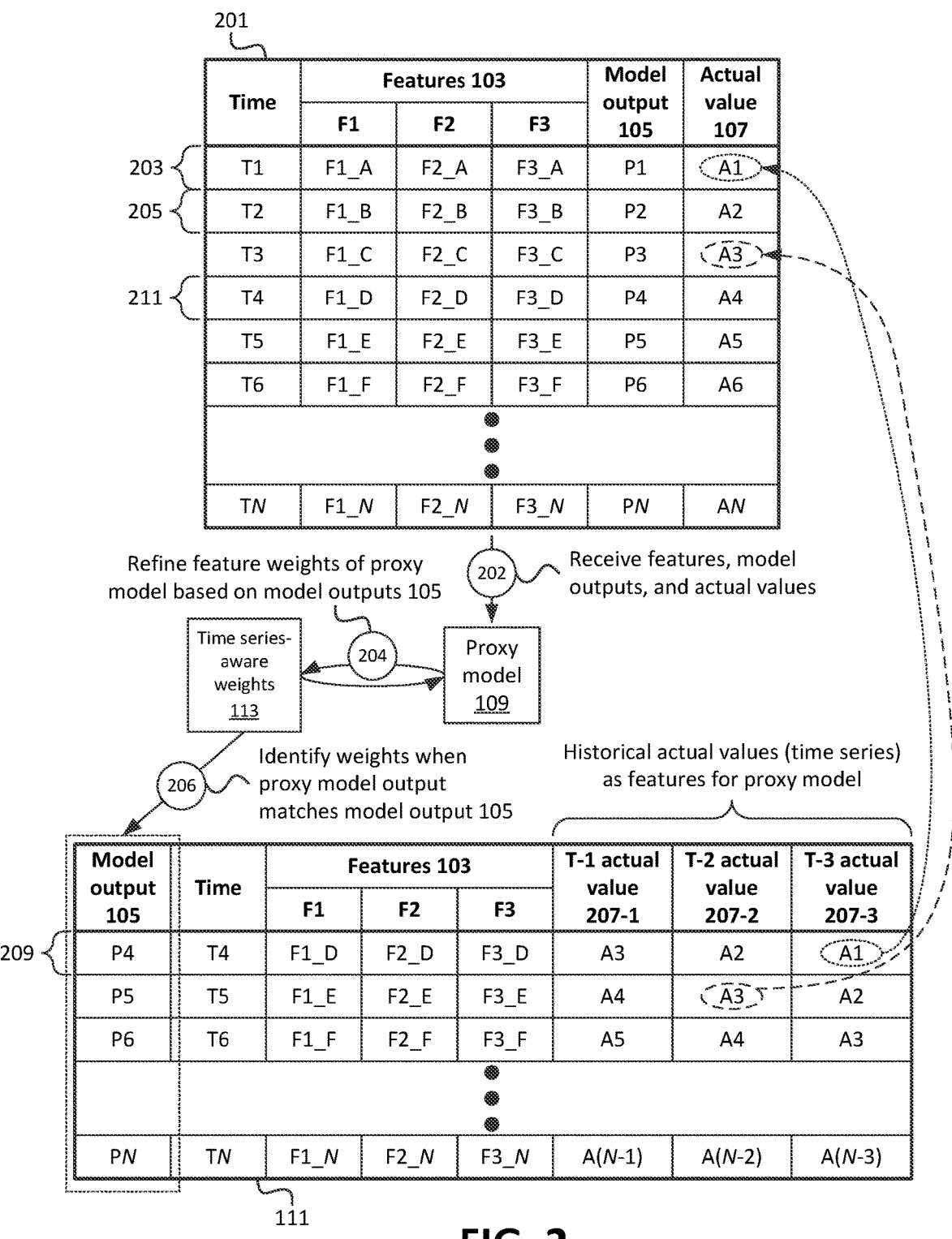
FIG. 2 illustrates an example of utilizing historical values as a feature based on which a model may be refined, in accordance with some embodiments.

FIG. 2 illustrates an example of how proxy model 109 may utilize features 103 (e.g., inputs to model 101), outputs 105 of model 101, as well as actual values 107 associated with features 103 to determine time-series aware weights 113. As noted above, determining time-series aware weights 113 may provide insight as to how model 101 generates outputs 105 based on features 103 when features 103 are provided as input to model 101.

Proxy model 109 may receive data structure 201, which may represent a time series of values for features 103, model outputs 105, and actual values 107. For example, each row of data structure 201 may be associated with a particular time window, point in time, time period, duration, interval, etc. (referred to herein as "time window" for the sake of brevity). Such time windows may refer to, for example, a one-second time window, a one-hour time window, a six-hour time window, a daily time window, a weekly time window, an annual time window, etc. For example, T1 may refer to Monday (e.g., a particular Monday or a set of Mondays), T2 may refer to Tuesday, T3 may refer to Wednesday, etc. As another example, T1 may refer to the year 2017, T2 may refer to the year 2018, and so on.

In this example, features 103 may include three example features F1, F2, and F3 (also referred to as "features F1-F3"). Entries in rows of 201 for these features F1-F3 may include values associated with each respective feature. For example, row 203 may include respective values F1_A, F2_A, and F3_A for features F1-F3 at time window T1 (where the phrase "at time window TN" may also be referred to as "at TN" herein) while row 205 may include respective values F1_B, F2 B, and F3 B for features F1-F3 at T2.

Values (e.g., including values F1_A, F2_A, F3_A, F1_B, etc.) for features (e.g., including features F1-F3) may include sensor measurements, scores, raw data, computed or derived values, or other suitable data associated with such features. In some situations, row 203 may be associated with sensor readings or other suitable data received, measured, determined, etc. by a particular device or system at T1, while row 205 may be associated with sensor readings or other suitable data associated with the same device or system at T2. In this sense, data structure may include a time series of values for features F1-F3, over a series of time windows (e.g., a time series including time windows T1 through TN, in this example).

Data structure 201 may further include, for each time window, a value for a model output 105 corresponding to the time window. For example, row 203 may reflect that, when provided values F1_A, F1_B, and F1_C for a particular set of input features 103 (e.g., features F1-F3) at T1, model 101 provided the value denoted as "P1" as output 105. Here, outputs 105 are represented as values P1-PN; in practice, outputs of 105 may include multiple values or sets of values for a given set of input features 103, may include one or more data structures for a given set of input features 103, may include one or more classifications or labels for a given set of input features 103, or other suitable types of data for a given set of input features 103.

Data structure 201 may further include, for each time window, a value for an actual value 107 corresponding to the time window. For example, row 203 may reflect that an actual value 107 denoted by "A1" is associated with values F1_A, F1_B, and F1_C for a particular set of input features 103 (e.g., features F1-F3) at T1. Actual values 107 may be a "ground truth" or type of validated or verified information associated with values F1_A, F1_B, and F1_C at T1. For example, actual values 107 may be determined via automated AI/ML techniques, supervised learning techniques, or the like. In some embodiments, actual values 107 may be determined based on sensor information or other types of measured or sensed information. Here, actual values 107 are represented as values A1-AN; in practice, actual values 107 may include multiple values or sets of values for a given set of input features 103, may include one or more data structures for a given set of input features 103, may include one or more classifications or labels for a given set of input features 103, or other suitable types of data for a given set of input features 103.

As one example, features F1-F3 may include telemetry data, LIDAR data, location information (e.g., Global Positioning System ("GPS") information), or other types of sensor data collected by one or more sensors associated with a particular autonomous vehicle or set of autonomous vehicles. Outputs 105 and actual values 107 may include labels, classifications, or the like that are associated with suitable devices or systems, systems, etc. For example, in some scenarios, outputs 105 and actual values 107 may be associated with attributes, performance metrics, measurements, etc. associated with a wireless network. In such scenarios, outputs 105 and actual values 107 may include labels, classifications, etc. such as "high latency," "low latency," "high signal quality," "low signal quality," etc. In some embodiments, outputs 105 and actual values 107 may include raw values, scores, computed values, etc. For example, outputs 105 and output values 107 may include values such as "uplink latency: 10 ms" (e.g., where "ms" refers to milliseconds), "downlink latency: 20 ms," "signal quality score: 97," etc. In some embodiments, outputs 105 and output values 107 may include additional or different scores, values, classifications, labels, etc.

In some scenarios, outputs 105 and actual values 107 may be associated with attributes, performance metrics, measurements, etc. associated with an autonomous vehicle. In such scenarios, outputs 105 and actual values 107 may include labels, classifications, etc. such as "speed bump," "pedestrian," "green traffic light," "railroad crossing," etc. In some embodiments, outputs 105 and actual values 107 may include autonomous vehicle control information, such as braking actuation information, throttle actuation information, steering information, etc. For example, outputs 105 may include such labels, control information, etc. as generated by model 101 based on particular values for features F1-F3 at particular time windows.

Actual values 107 may include "ground truth" information for features F1-F3 at these time windows, such as validated information, feedback information, etc. indicating whether a measured set of radio frequency ("RF") conditions of a wireless network matched (e.g., exactly matched or matched within a threshold) values (e.g., predicted or estimated values) indicated by outputs 105, whether a measured set of performance information (e.g., latency, throughput, jitter, etc.) matched values indicated by outputs 105, etc. In some embodiments, actual values 107 may indicate whether a particular action or adjustment was appropriate (e.g., increased performance, reduced power consumption, and/or otherwise increased a particular yield by a threshold amount or provided at least a threshold measure of improvement to some metric). For example, actual values 107 may indicate that a particular adjustment to beamforming parameters of one or more antennas increased a coverage area, reduced latency or dropped calls, increased between for UEs, etc., if such yields were predicted by model 101.

Additionally, or alternatively, actual values 107 may indicate whether a speed bump was present, whether a pedestrian was present, whether providing a braking actuation instruction was appropriate (e.g., which may be based on whether a passenger or operator of the vehicle performed some corrective action such as applying a throttle of the vehicle shortly after the braking actuation instruction was provided), or other suitable ground truth information. That is, in some situations, a difference, delta, error, etc. may be observed between particular values of outputs 105 and actual values 107 for particular time windows.

In some embodiments, one or more actual values 107 may be included as one or more features 103. For example, a particular output 105, associated with a particular time, may have been determined based on one or more features 103 associated with previous times. In some embodiments, actual values 107 may be different from, and/or may not be included in, features 103. For example, in some embodiments, actual values 107 may include actual values of a same type or category as outputs 105 (e.g., network modification actions), but may not be necessarily used by model 101 to generate outputs 105.

In some embodiments, proxy model 109 may receive (at 202) data structure 201 and/or some other representation (including multiple data structures or representations) of features 103 associated with a particular set of time windows, outputs 105 associated with the particular set of time windows, and actual values 107 associated with the particular set of time windows. Proxy model 109 may be trained (at 204) based on a modified version of data structure 201, which may be represented as output-keyed features 111. As discussed below, such training may include refining feature weights associated with values for features F1-F3, as well as utilizing time series-based actual values as features, for particular output 105 values at particular times.

For example, as shown, each row of output-keyed features 111 may be associated with a particular model output 105 value. In some embodiments, each row of output-keyed features 111 may be keyed to a particular model output 105 value and a particular time window. For example, the same model output 105 value associated with two different time windows may be associated with two rows in output-keyed features 111. On the other hand, in some embodiments, each row of output-keyed features 111 may be keyed to a particular model output 105 value (or range of values), such that the same model output 105 value (or range of values) associated with two different time windows may be associated with a single row in output-keyed features 111. For the sake of simplicity, FIG. 2 is described in the context of each distinct model output 105 value being associated with a distinct time window.

For example, each row of output-keyed features 111 may include, for a particular model output 105 value at a particular time window, a set of features 103 associated with the particular model output 105 value, as well as a time series of historical actual values 207 associated with time windows relative to the particular model output 105 value. For example, row 209 of output-keyed features 111 may be associated with an example value of P4 for model output 105. In this example, data structure 201 indicates that P4 was an output 105 value at T4. Row 209 may further include values F1_D, F2 D, and F3_D for features F1-F3, as such values are associated with P4 in data structure 201 (e.g., at row 211).

Row 209 may also include the value A3 for historical actual value 207-1, which may be an actual value 107 associated with "T-1" with respect to T4 (e.g., T3 in this example). Similarly, row 209 may include the value A2 for historical actual value 207-2, which may be an actual value 107 associated with "T-2" with respect to T4 (e.g., T2 in this example). Further, row 209 may include the value A1 for historical actual value 207-3, which may be an actual value 107 associated with "T-3" with respect to T4 (e.g., T1 in this example).

Figure 3:
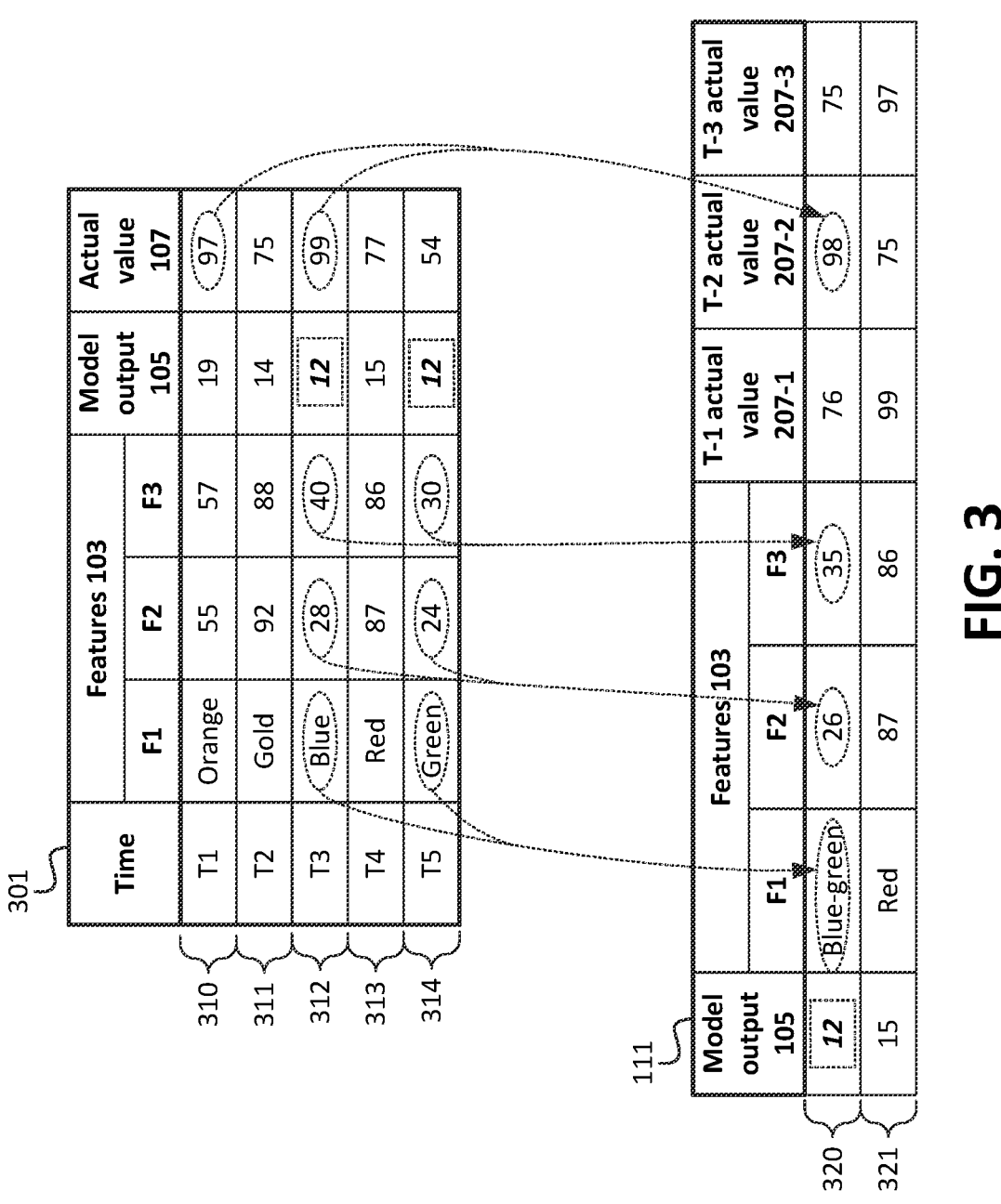
FIG. 3 illustrates an example of determining a set of output-keyed features, in accordance with some embodiments.

In the example of FIG. 2, P4 is included in one row of data structure 201, and values (e.g., feature values and/or historical actual values 207) may accordingly each be included in one row of data structure 201. In situations where the same model output 105 value (i.e., P4 in this example) is present in multiple rows of data structure 201, output-keyed features 111 may include, as values for features F1-F3, an average, median, mean, or other type of value derived from features F1-F3 associated with the multiple rows of data structure 201. For example, as shown in FIG. 3, data structure 301 may include particular example values for features 103, model outputs 105, and actual values 107. For example, row 312 may include a value of "Blue" for F1 at T3 (e.g., which may be denoted by a color name, a hexadecimal code, and/or some other type of encoded value), a value of 28 for F2 at T3, and a value of 40 at T3. Row 314 may include a value of "Green" for F1 at T5, a value of 24 for F2 at T5, and a value of 30 for F3 at T5. Rows 312 and 314 may both be associated with the same model output 105 value of (i.e., a value of 12 in this example).

Row 320 (e.g., which may be a row of output-keyed features 111 generated based on data structure 301) may be associated with the particular model output 105 value of 12. As such, row 320 may include average, mean, and/or other derived or combined values from rows 312 and 314 of data structure 301, which are also associated with the value of 12 for model output 105. For example, row 320 may include the value "blue-green" (or some other suitable combination or derivation of "blue" and "green") for F1, based on the values "blue" and "green" for F1 in rows 312 and 314. Row 320 may also include the value 26 for F2, which may be a mean or other suitable derivation of the values 24 and 26 for F2 in rows 312 and 314. Row 320 may also include the value 35 for F3, which may be a mean or other suitable derivation of the values 40 and 30 for F3 in rows 312 and 314.

Row 320 may also include time series of historical actual values 207 associated with rows 312 and 314. For example, row 320 may include a value of 76 for historical actual value 207-1, which may be a mean or other suitable derivation of the values 75 and 77 for actual value 107 in rows 311 and 313. That is, rows 311 and 313 are respectively associated with a "T-1" with respect to rows 312 and 314, which include the particular model output 105 value of 12.

Row 320 may also include a value of 98 for historical actual value 207-2, which may be a mean or other suitable derivation of the values 97 and 99 for actual value 107 in rows 310 and 312 (e.g., associated with a "T-2" with respect to rows 312 and 314). Row 320 may also include a value of 75 for historical actual value 207-3. In this example, since data structure 301 does not include a "T-3" with respect to row 312 (e.g., "T-3" would be before the beginning of the time series in data structure 301), row 320 includes a value of 75, which is equal to the actual value reflected in row 311 (e.g., occurring at T2, which is "T-3" with respect to T5).

Row 321 of output-keyed features 111 may include the values for features F1-F3 from row 313, which is associated with the value of 15 for model output 105. Row 321 may also include the relevant historical values 207 associated with row 313, which may include the actual values 107 from preceding rows 312, 311, and 310.

As noted above, proxy model 109 may be trained, modified, refined, etc. (at 204) in order to produce or replicate respective values for model output 105 based on output-keyed values for features F1-F3 and/or historical actual values 207. Such training, modifying, refining, etc. may include modifying time-series aware weights 113 and/or other operations associated with proxy model 109, which may be applied to features F1-F3 and/or historical actual values 207 to generate outputs of proxy model 109. When the outputs of proxy model 109 match (at 206) outputs 105, the time-series aware weights 113 applied to features F1-F3 and/or historical actual values 207 may be determined, as such time-series aware weights 113 may indicate or explain how model 101 has generated particular output values.

In some embodiments, the outputs of proxy model 109 may "match" model output 105 when some or all of the values of the outputs of proxy model 109 equal or are within a threshold measure of variation of corresponding model outputs 105. In some embodiments, one or more scores or other derived values may be generated based on some or all of the outputs of proxy model 109, and may be compared to a corresponding set of scores or other derived values generated based on model outputs 105. If the respective scores or other derived values exceed a threshold measure of similarity, then model outputs 105 may be determined as "matching" the outputs of proxy model 109.

FIG. 4 shows example data structure 401, which may include some or all of the information shown in FIG. 2 with respect to output-keyed features 111, as well as weights applied to some or all of the features and/or historical actual values. Such weights may be adjusted, refined, etc. as part of the training (at 204) of proxy model 109. For example, as noted above, the training process may include adjusting some or all of these weights such that when the weights are applied to features 103 and/or historical actual values 207 associated with a particular model output 105, proxy model 109 produces an output value that matches (e.g., within a threshold) the value of the particular model output 105.

While weights for individual features 103 and/or historical actual values 207 are shown here, in practice, other variables, functions, values, etc. may be adjusted or determined as part of the training (at 204) of proxy model 109. For example, measures of affinity or correlation between particular features 103 and/or historical actual values 207 may be determined, functions or other operations to apply to features 103 and/or historical actual values 207 may be determined, etc.

Further, while FIG. 4 shows each feature 103 or historical actual value 207 being associated with a particular weight, in some embodiments, different values of features 103 and/or historical actual values 207 may be associated with different weights, functions, etc. For example, while FIG. 4 shows that feature F1 is associated with a particular weight "WF1," in some embodiments, feature F1 may be associated with a first weight when the value of F1 is (or is within a threshold range of) the value "F1_D," while feature F1 may be associated with a second weight when the value of F1 is (or is within a threshold range of) the value "F1_E."

As noted above, since proxy model 109 is trained (at 206) to achieve the same or similar (e.g., within a threshold range) outputs as model 101, the feature importance weights determined with respect to features 103 and historical actual values 207 based on such training may indicate the feature importance of these features 103 with respect to model 101. Further, the relationship between outputs 105 of model 101 to historical actual values 207 may be determined, which may be used to indicate a measure of error with respect to model 101 and time series-related patterns, and/or may otherwise be used to refine model 101. For example, such relationships may indicate whether time of day, day of the week, seasonality, holidays, etc. have an effect on outputs 105 of model 101, and/or the extent to what effect such time series-related patterns have on outputs 105 of model 101. In some scenarios, the effect of time series-related patterns may be greater than other features 103 evaluated by model 101.

Figure 5:
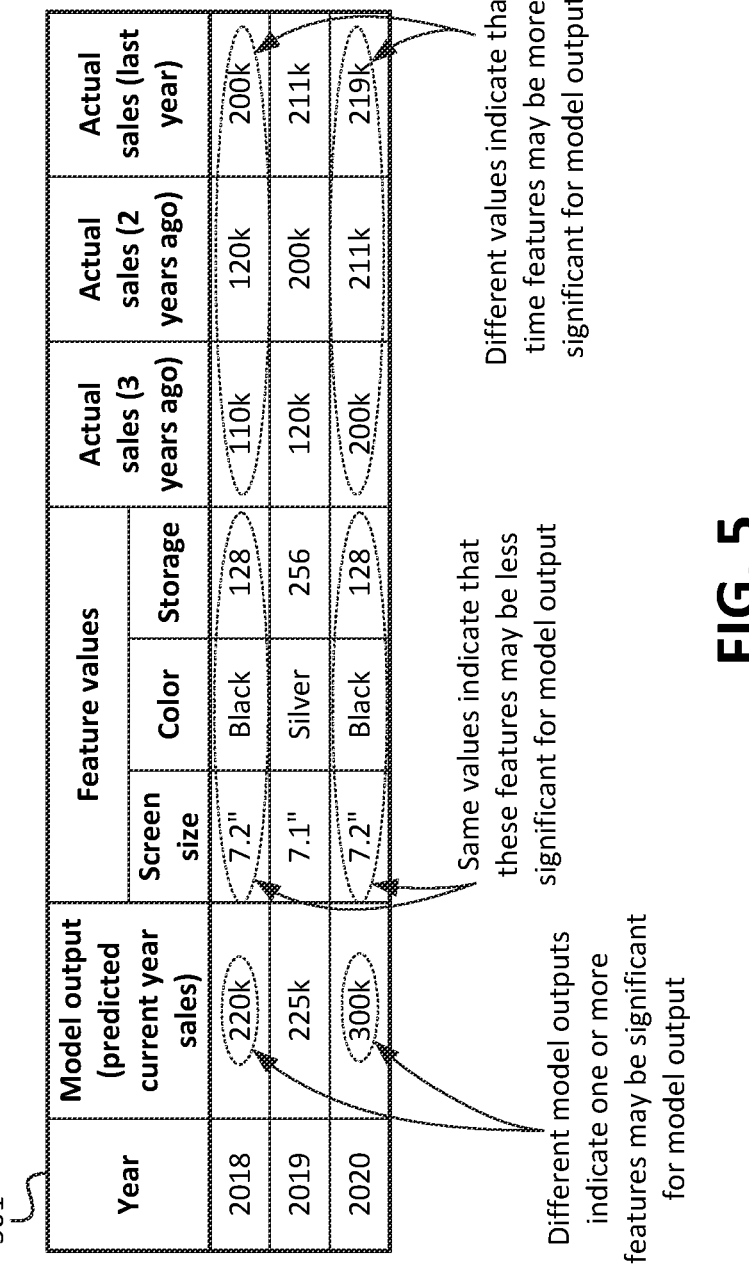
FIG. 5 illustrates example values based on which a time series of historical values may be determined as having relative significance for a mode, in accordance with some embodiments.

For example, as shown in FIG. 5, data structure 501 includes example model outputs (e.g., a prediction of current-year sales of a particular item, such as a mobile phone), particular features and their values (e.g., attributes of mobile phones sold in particular years), as well as actual historical values associated with a given model output value (e.g., actual sales from an immediately prior year, actual sales from two years ago, etc.). Data structure 501 may be, for example, an instance of output-keyed features 111 based on which proxy model 109 may be trained.

As shown, the model outputs "220 k" (e.g., 220,000 or approximately 220,000) and "300 k" (e.g., associated with the years 2018 and 2020, respectively) may be identified as being different values, and/or as being at least a threshold difference. This degree of difference between these model output values may indicate that one or more features and/or time series-related patterns associated with each respective output value are relatively important (e.g., may cause the output values to be different).

In this example, features regarding the mobile phone (or phones) sold in these years may be the same. For example, the phone (or phones) sold in 2018 and 2020 may both have a screen size of 7.2 inches, may both be black, and may both have a storage size of 128 GB. On the other hand, the time series of actual historical values (e.g., historical sales) associated with these two years may be different. For 2018, the preceding years' actual sales may have been 200 k, 120 k, and 110 k, in descending order of year, while the preceding years' actual sales for 2020 may have been 219 k, 211 k, and 200 k. Since the features of the phones for 2018 and 2020 were the same or were relatively similar and the outputs of model 101 for these years was relatively different (e.g., 220 k as opposed to 300 k), the time series-related patterns associated with the actual sales values (which were different for 2018 and 2020) may be identified as relatively important for the output of model 101. Thus, the weights for features relating to the attributes of the phone (e.g., as determined by training proxy model 109) may be relatively low, in relation to the weights associated with historical actual values of sales of the phone. As such, in this example, model 101 may be refined to use historical actual values of sales of the phone in predicting future sales of the phone. Additionally, or alternatively, weights associated with such historical actual values, as used by model 101, may be increased in relation to weights of attributes associated with the phone.

FIG. 6 illustrates an example process 600 for refining model 101 based on identifying weights associated with a time series of historical data associated with a set of inputs to model 101, in accordance with embodiments described herein.

As shown, process 600 may include receiving (at 602) a set of outputs generated by a first model (e.g., model 101) based on a set of inputs. For example, as discussed above, the set of inputs may include a particular set of features 103 and/or values for the features. Such features and values may relate to, for example, sensor data and/or other suitable types of data. In some embodiments, the features and values may relate to network performance metrics (e.g., between, latency, jitter, etc. experienced by UEs or other devices connected to or included in a wireless network), network load metrics (e.g., quantity of UEs connected to a particular base station or cell, used and/or available RF capacity, etc.), network configuration attributes (e.g., beamforming attributes such as antenna azimuth angle, beam power, beam width, etc.), and/or other metrics, attributes, features, etc.

The set of inputs may include time-based information, in which different instances of the inputs may include values that differ over different time windows. The outputs may include, for example, predictions, classifications, etc. generated by model 101 based on the set of outputs. In some embodiments, the outputs may include predicted metrics, attributes, features, etc. For example, the outputs may include a predicted network latency for a given base station of a wireless network for a particular time period based on a quantity of UEs connected to the base station in the particular time period, signal quality metrics associated with the UEs connected to base station in the particular time period, etc. In some embodiments, the outputs may include one or more actions to take with respect to the wireless network, such as adjusting beamforming parameters of the base station in situations where model 101 identifies that adjusting such beamforming parameters may reduce latency experienced by UEs connected to the base station.

Process 600 may further include identifying (at 604) historical values corresponding to the inputs and/or outputs associated with model 101. The historical values may include "ground truth" information, validation information, and/or other information that may be modeled, or attempted to be modeled, by model 101. For example, assume that a particular output of model 101 indicates a predicted or estimated value (e.g., a particular output) as being associated with a particular set of features and/or values for such features. The historical values may include verified, measured, trusted, etc. values that have been identified with respect to the particular set of features and/or values for such features. The historical values may, in some embodiments, also include information indicating times at which such historical values were observed, measured, and/or are otherwise associated. For example, such historical values may include actual (e.g., measured and/or reported) values for latency in other time periods when given varying measures of quantities of connected UEs, signal quality metrics, etc. during such other time periods.

Process 600 may additionally include training (at 606) a second model based on inputs and outputs associated with the first model, and further based on the identified historical values. For example, as discussed above with respect to FIGS. 2 and 3, proxy model 109 may be trained based on a set of values for the input features that are associated with one or more particular outputs of model 101 (e.g., values for the input features based on which the one or more outputs were generated by model 101). Proxy model 109 may further be trained based on historical values, which may be arranged as a time series, associated with the identified set of values for the input features. In this manner, proxy model 109 may be trained based on a time series of output-keyed features as well as their corresponding historical actual values.

Process 600 may also include determining (at 608), based on training proxy model 109, weights associated with the inputs and/or the historical values corresponding to the inputs. For example, as discussed above, weights associated with the features and/or the corresponding historical values may be adjusted, refined, etc., such that the output of proxy model 109 based on the features and/or the corresponding historical values may match (e.g., within a threshold measure of similarity) the outputs of model 101. In some embodiments, the top-ranked features according to weight may be identified (e.g., the top three features, top ten features, features associated with at least a threshold weight, etc.). In this manner, the most important features, which may in some situations include historical values, may be identified.

Process 600 may further include refining (at 610) model 101 using the set of weights determined based on training proxy model 109. For example, model 101 may be enhanced, augmented, etc. to take historical data into account when generating outputs, and/or weights attributed to particular features may be increased or decreased based on the training (at 606) of proxy model 109. In some embodiments, model 101 may be refined using only the top-ranked weights mentioned above.

In this manner, model 101 may be refined not only based on the features originally used by model 101, but further based on historical actual data which may, in some circumstances, be readily available. As such, the readily available historical data may be leveraged in such a way that model 101, which may have been used for predictions, classifications, etc. related to the historical data, may further be improved. Improved model 101 may be used to, for example, determine outputs including network actions to take when particular conditions or attributes are detected.

For example, model 101 may be used to modify beamforming parameters of one or more base stations of the wireless network when particular sets of parameters, metrics, etc. are detected, in a manner that takes temporal patterns or factors into account. For example, improved model 101 may be improved to detect patterns varying with workdays (e.g., Monday-Friday) as opposed to weekends (e.g., Saturdays and Sundays), seasons, holidays, etc. For example, where model 101 may not have previously taken holidays into account, improved model 101 may determine that network load may be increased on a holiday, and that beamforming parameters should be adjusted to account for the increased network load on the holiday.

Figure 7:
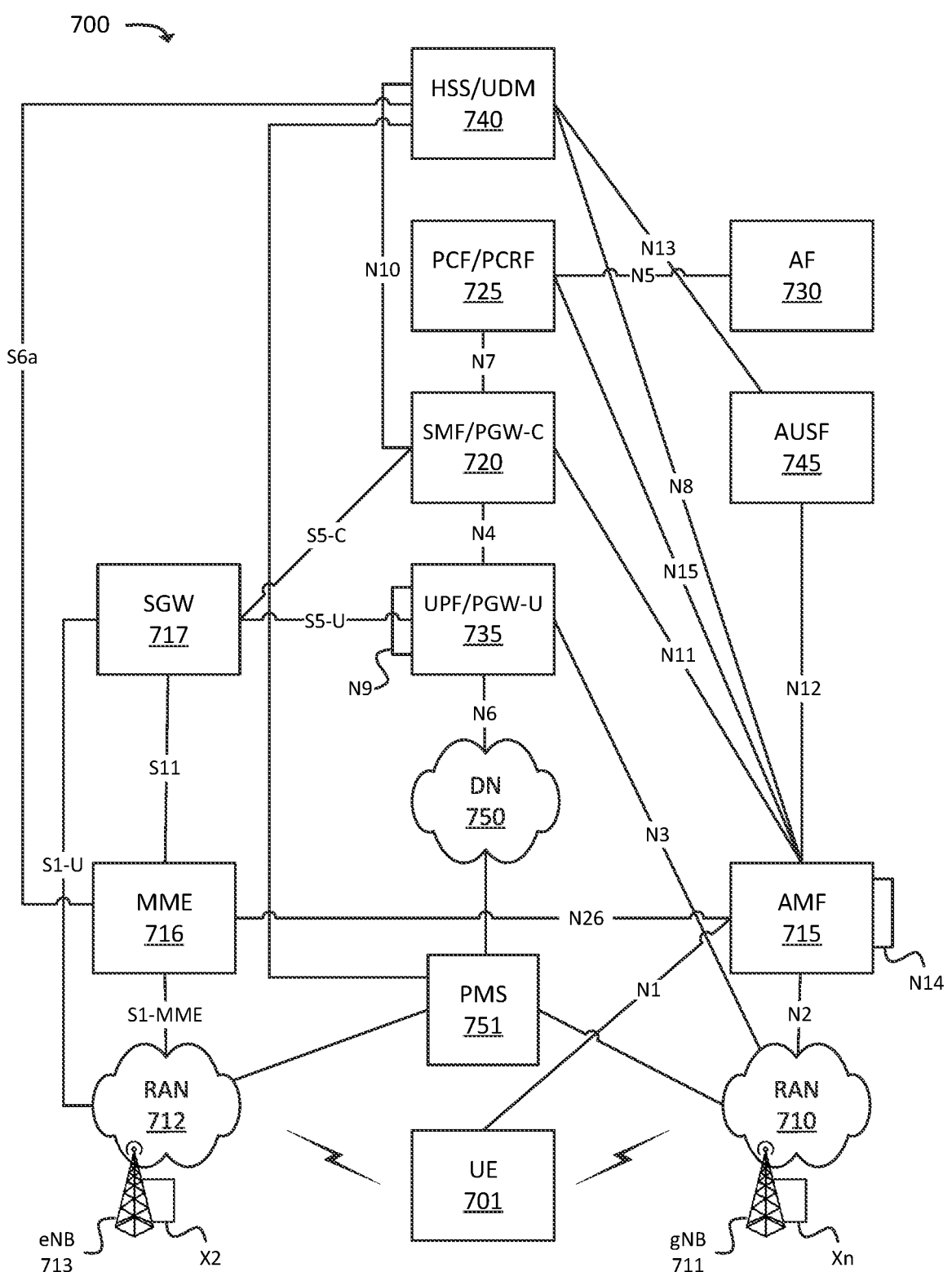
FIG. 7 illustrates an example environment in which one or more embodiments, described herein, may be implemented.

FIG. 7 illustrates an example environment 700, in which one or more embodiments may be implemented. In some embodiments, environment 700 may correspond to a Fifth Generation ("5G") network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 700 may include UE 701, RAN 710 (which may include one or more Next Generation Node Bs ("gNBs") 711), RAN 712 (which may include one or more evolved Node Bs ("eNBs") 713), and various network functions such as Access and Mobility Management Function ("AMF") 715, Mobility Management Entity ("MIME") 716, Serving Gateway ("SGW") 717, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Home Subscriber Server ("HSS")/Unified Data Management ("UDM") 740, and Authentication Server Function ("AUSF") 745. Environment 700 may also include one or more networks, such as Data Network ("DN") 750. Environment 700 may include one or more additional devices or systems communicatively coupled to one or more networks (e.g., DN 750), such as Proxy Modeling System ("PMS") 751, which may perform some or all of the operations described above with respect to FIGS. 1A, 1B, and 2-6.

The example shown in FIG. 7 illustrates one instance of each network component or function (e.g., one instance of SMF/PGW-C 720, PCF/PCRF 725, UPF/PGW-U 735, HSS/UDM 740, and/or AUSF 745). In practice, environment 700 may include multiple instances of such components or functions. For example, in some embodiments, environment 700 may include multiple "slices" of a core network, where each slice includes a discrete set of network functions (e.g., one slice may include a first instance of SMF/PGW-C 720, PCF/PCRF 725, UPF/PGW-U 735, HSS/UDM 740, and/or AUSF 745, while another slice may include a second instance of SMF/PGW-C 720, PCF/PCRF 725, UPF/PGW-U 735, HSS/UDM 740, and/or AUSF 745). The different slices may provide differentiated levels of service, such as service in accordance with different Quality of Service ("QoS") parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively, or additionally, one or more of the devices of environment 700 may perform one or more network functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 701 may include a computation and communication device, such as a wireless mobile communication device that is capable of communicating with RAN 710, RAN 712, and/or DN 750. UE 701 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 701 may send traffic to and/or receive traffic (e.g., user plane traffic) from DN 750 via RAN 710, RAN 712, and/or UPF/PGW-U 735.

RAN 710 may be, or may include, a 5G RAN that includes one or more base stations (e.g., one or more gNBs 711), via which UE 701 may communicate with one or more other elements of environment 700. UE 701 may communicate with RAN 710 via an air interface (e.g., as provided by gNB 711). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, AMF 715, and/or one or more other devices or networks) and may communicate the traffic to UE 701 via the air interface.

RAN 712 may be, or may include, a LTE RAN that includes one or more base stations (e.g., one or more eNBs 713), via which UE 701 may communicate with one or more other elements of environment 700. UE 701 may communicate with RAN 712 via an air interface (e.g., as provided by eNB 713). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, SGW 717, and/or one or more other devices or networks) and may communicate the traffic to UE 701 via the air interface.

AMF 715 may include one or more devices, systems, Virtualized Network Functions ("VNFs"), Cloud-Native Network Functions ("CNFs"), etc., that perform operations to register UE 701 with the 5G network, to establish bearer channels associated with a session with UE 701, to hand off UE 701 from the 5G network to another network, to hand off UE 701 from the other network to the 5G network, manage mobility of UE 701 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, CNFs, etc., that perform operations to register UE 701 with the EPC, to establish bearer channels associated with a session with UE 701, to hand off UE 701 from the EPC to another network, to hand off UE 701 from another network to the EPC, manage mobility of UE 701 between RANs 712 and/or eNBs 713, and/or to perform other operations.

SGW 717 may include one or more devices, systems, VNFs, CNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, CNFs, etc., that gather, process, store, and/or provide information in a manner described herein. SMF/PGW-C 720 may, for example, facilitate the establishment of communication sessions on behalf of UE 701. In some embodiments, the establishment of communications sessions may be performed in accordance with one or more policies provided by PCF/PCRF 725.

PCF/PCRF 725 may include one or more devices, systems, VNFs, CNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, CNFs, etc., that receive, store, and/or provide information that may be used in determining parameters (e.g., quality of service parameters, charging parameters, or the like) for certain applications.

UPF/PGW-U 735 may include one or more devices, systems, VNFs, CNFs, etc., that receive, store, and/or provide data (e.g., user plane data). For example, UPF/PGW-U 735 may receive user plane data (e.g., voice call traffic, data traffic, etc.), destined for UE 701, from DN 750, and may forward the user plane data toward UE 701 (e.g., via RAN 710, SMF/PGW-C 720, and/or one or more other devices). In some embodiments, multiple UPFs 735 may be deployed (e.g., in different geographical locations), and the delivery of content to UE 701 may be coordinated via the N9 interface (e.g., as denoted in FIG. 7 by the line marked "N9" originating and terminating at UPF/PGW-U 735). Similarly, UPF/PGW-U 735 may receive traffic from UE 701 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

HSS/UDM 740 and AUSF 745 may include one or more devices, systems, VNFs, CNFs, etc., that manage, update, and/or store, in one or more memory devices associated with AUSF 745 and/or HSS/UDM 740, profile information associated with a subscriber. AUSF 745 and/or HSS/UDM 740 may perform authentication, authorization, and/or accounting operations associated with the subscriber and/or a communication session with UE 701.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 701 may communicate, through DN 750, with data servers, other UEs 701, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 701 may communicate.

PMS 751 may include one or more devices, systems, VNFs, CNFs, etc., that perform one or more operations described above with respect to one or more embodiments. For example, PMS 751 may perform some or all of the operations described above with respect to model 101 and/or proxy model 109, including using proxy model 109 to refine model 101.

Figure 8:
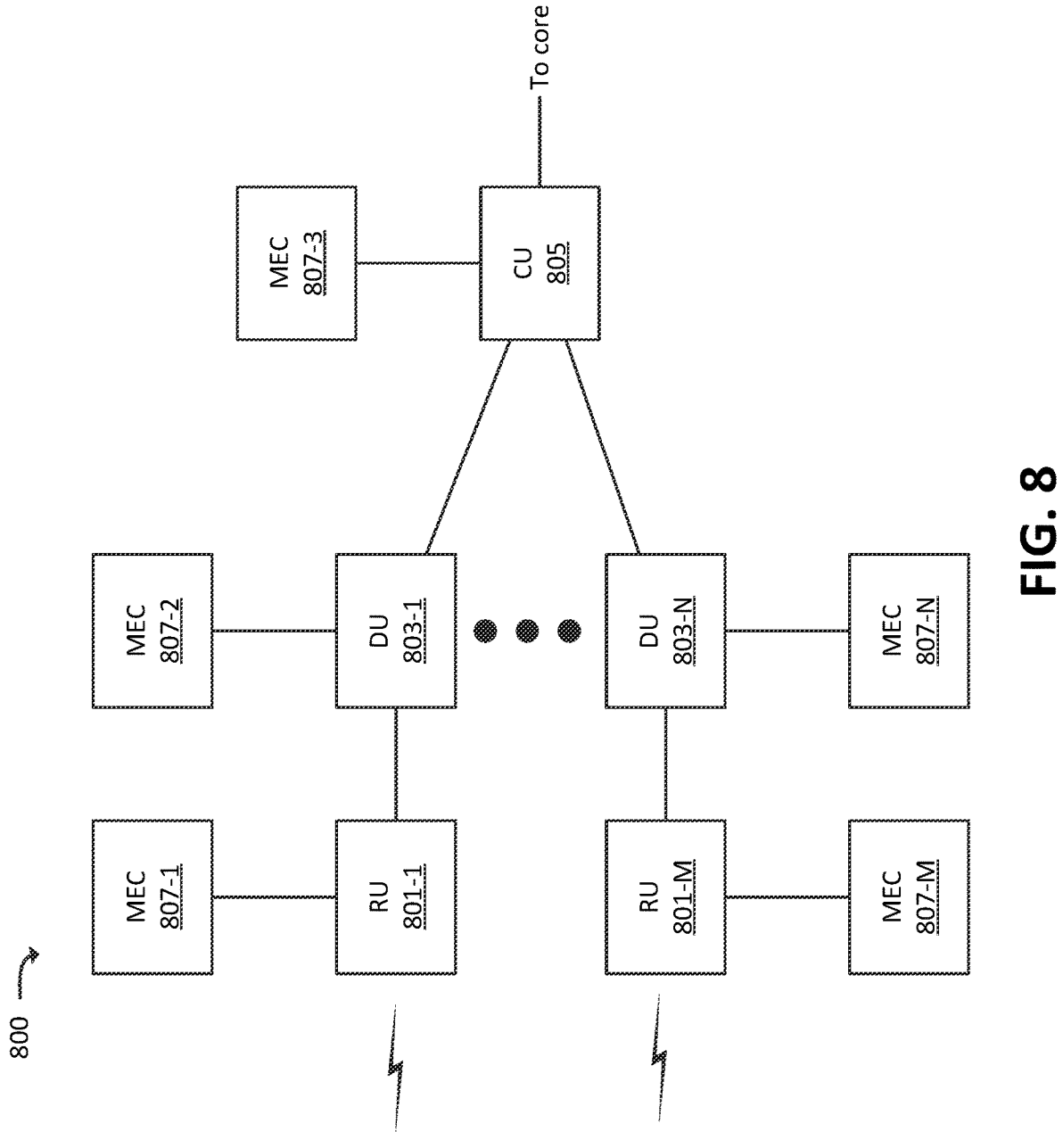
FIG. 8 illustrates an example arrangement of a radio access network ("RAN"), in accordance with some embodiments.

FIG. 8 illustrates an example Distributed Unit ("DU") network 800, which may be included in and/or implemented by one or more RANs (e.g., RAN 710, RAN 712, or some other RAN). In some embodiments, a particular RAN may include one DU network 800. In some embodiments, a particular RAN may include multiple DU networks 800. In some embodiments, DU network 800 may correspond to a particular gNB 711 of a 5G RAN (e.g., RAN 710). In some embodiments, DU network 800 may correspond to multiple gNBs 711. In some embodiments, DU network 800 may correspond to one or more other types of base stations of one or more other types of RANs. As shown, DU network 800 may include Central Unit ("CU") 805, one or more Distributed Units ("DUs") 803-1 through 803-N (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 715 and/or UPF/PGW-U 735). In the uplink direction (e.g., for traffic from UEs 701 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular UE 701, and may determine which DU(s) 803 should receive the downlink traffic. DU 803 may include one or more devices that transmit traffic between a core network (e.g., via CU 805) and UE 701 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 701.

RU 801 may include hardware circuitry (e.g., one or more RF transceivers, antennas, radios, and/or other suitable hardware) to communicate wirelessly (e.g., via an RF interface) with one or more UEs 701, one or more other DUs 803 (e.g., via RUs 801 associated with DUs 803), and/or any other suitable type of device. In the uplink direction, RU 801 may receive traffic from UE 701 and/or another DU 803 via the RF interface and may provide the traffic to DU 803. In the downlink direction, RU 801 may receive traffic from DU 803, and may provide the traffic to UE 701 and/or another DU 803.

RUs 801 may, in some embodiments, be communicatively coupled to one or more Multi-Access/Mobile Edge Computing ("MEC") devices, referred to sometimes herein simply as "MECs" 807. For example, RU 801-1 may be communicatively coupled to MEC 807-1, RU 801-M may be communicatively coupled to MEC 807-M, DU 803-1 may be communicatively coupled to MEC 807-2, DU 803-N may be communicatively coupled to MEC 807-N, CU 805 may be communicatively coupled to MEC 807-3, and so on. MECs 807 may include hardware resources (e.g., configurable or provisionable hardware resources) that may be configured to provide services and/or otherwise process traffic to and/or from UE 701, via a respective RU 801.

For example, RU 801-1 may route some traffic, from UE 701, to MEC 807-1 instead of to a core network (e.g., via DU 803 and CU 805). MEC 807-1 may process the traffic, perform one or more computations based on the received traffic, and may provide traffic to UE 701 via RU 801-1. In this manner, ultra-low latency services may be provided to UE 701, as traffic does not need to traverse DU 803, CU 805, and an intervening backhaul network between DU network 800 and the core network. In some embodiments, MEC 807 may include, and/or may implement, some or all of the functionality described above with respect to PMS 751.

Figure 9:
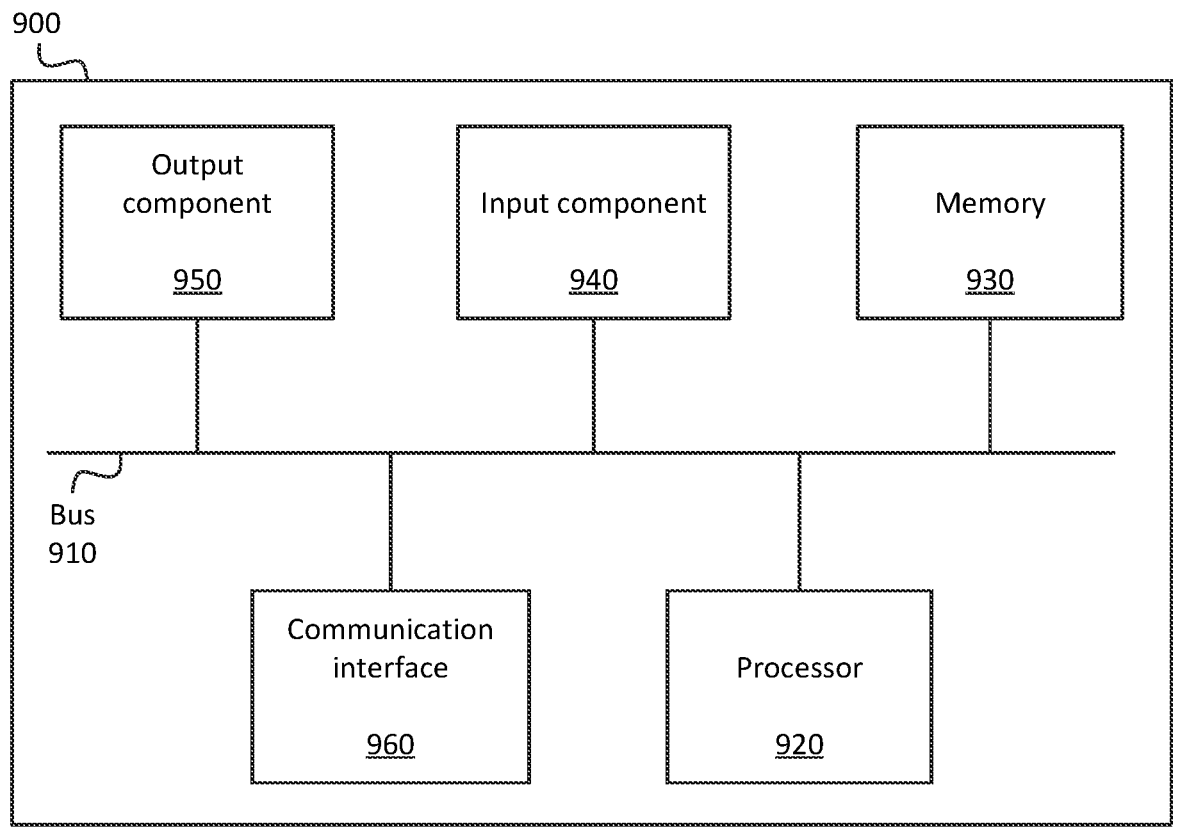
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. In some embodiments, processor 920 may be or may include one or more hardware processors. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or other receives or detects input from a source external to 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1A, 1B, and 2-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or,"

as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
    receive a first set of outputs generated by a first model based on a set of inputs, the first set of outputs including one or more network actions and the set of inputs including one or more attributes of a wireless network;
    identify a set of historical actual values, determined by one or more sensors, that correspond to the set of inputs,
        wherein the first set of outputs, the set of inputs, and the historical actual values are associated with a particular time series that includes a plurality of time windows,
        wherein one or more particular historical actual values, one or more particular inputs, and one or more particular outputs of the first model are associated with a particular time window of the plurality of time windows;
    train a second model based on:
        the set of inputs to the first model,
        the first set of outputs of the first model, and
        the set of historical actual values that correspond to the set of inputs and the first set of outputs,
        wherein training the second model includes;
            determining, for particular respective time windows of the plurality of time windows, respective measures of similarity between the first set of outputs of the first model and the set of historical actual values;
            generating, by the second model, a second set of outputs based on the set of inputs; and
            comparing the second set of outputs to the set of inputs;
    determine, based on the determined respective measures of similarity between the first set of outputs of the first model and the set of historical actual values, and further based on comparing the second set of outputs to the first set of outputs, a set of weights associated with the set of historical actual values;
    refine the first model based on the set of weights associated with the set of historical actual values;
    use the refined first model to determine a particular modification with respect to the wireless network based on a particular set of attributes of the wireless network; and
    perform the determined particular modification, determined by the refined first model, with respect to the wireless network.

2. The device of claim 1, wherein the set of inputs includes a first value that is associated with a first time window of the time series, and wherein the set of historical actual values includes at least a second value that is associated with a second time window of the time series that occurs prior.

3. The device of claim 1, wherein the set of weights is a first set of weights, wherein the one or more processors are further configured to:

determine, based on training the second model, a second set of weights associated with the set of inputs; and refine the first model further based on the second set of weights associated with the set of inputs.

4. The device of claim 1, wherein performing the determined particular modification includes modifying one or more beamforming parameters of the wireless network.

5. The device of claim 1, wherein training the second model includes determining values for the set of weights which, when applied by the second model to the set of inputs and the historical actual values, provide values that correspond to the outputs of the first model.

6. The device of claim 1, wherein the first set of outputs of the first model include one or more predicted values that are based on one or more particular inputs of the set of inputs, and wherein the historical actual values include one or more ground truth values that are associated with the one or more particular inputs of the set of inputs.

7. The device of claim 1, wherein determining a particular weight, associated with a particular time window of the plurality of time windows, is based on:

a particular set of outputs of the first model that correspond to the particular time window, and one or more particular historical actual values, of the set of historical actual values, that correspond to the particular time window.

8. A non-transitory computer-readable medium, storing a plurality of processor-executable instructions to:

receive a first set of outputs generated by a first model based on a set of inputs, the first set of outputs including one or more network actions and the set of inputs including one or more attributes of a wireless network;

identify a set of historical actual values, determined by one or more sensors, that correspond to the set of inputs, wherein the first set of outputs, the set of inputs, and the historical actual values are associated with a particular time series that includes a plurality of time windows, wherein one or more particular historical actual values, one or more particular inputs, and one or more particular outputs of the first model are associated with a particular time window of the plurality of time windows;

train a second model based on:

the set of inputs to the first model, the first set of outputs of the first model, and the set of historical actual values that correspond to the set of inputs and the first set of outputs, wherein training the second model includes;

determining, for particular respective time windows of the plurality of time windows, respective measures of similarity between the first set of outputs of the first model and the set of historical actual values;

generating, by the second model, a second set of outputs based on the set of inputs; and comparing the second set of outputs to the set of inputs;

determine, based on the determined respective measures of similarity between the first set of outputs of the first model and the set of historical actual values, and further based on comparing the second set of outputs to the first set of outputs, a set of weights associated with the set of historical actual values;

refine the first model based on the set of weights associated with the set of historical actual values;

use the refined first model to determine a particular modification with respect to the wireless network based on a particular set of attributes of the wireless network; and perform the determined particular modification, determined by the refined first model, with respect to the wireless network.

9. The non-transitory computer-readable medium of claim 8, wherein the set of inputs includes a first value that is associated with a first time window of the time series, and wherein the set of historical actual values includes at least a second value that is associated with a second time window of the time series that occurs prior to the first time window of the time series.

10. The non-transitory computer-readable medium of claim 8, wherein the set of weights is a first set of weights, wherein the plurality of processor-executable instructions further include processor-executable instructions to:

determine, based on training the second model, a second set of weights associated with the set of inputs; and refine the first model further based on the second set of weights associated with the set of inputs.

11. The non-transitory computer-readable medium of claim 8, wherein performing the determined particular modification includes modifying one or more beamforming parameters of the wireless network.

12. The non-transitory computer-readable medium of claim 8, wherein training the second model includes determining values for the set of weights which, when applied by the second model to the set of inputs and the historical actual values, provide values that correspond to the outputs of the first model.

13. The non-transitory computer-readable medium of claim 8, wherein the first set of outputs of the first model include one or more predicted values that are based on one or more particular inputs of the set of inputs, and wherein the historical actual values include one or more ground truth values that are associated with the one or more particular inputs of the set of inputs.

14. The non-transitory computer-readable medium of claim 8, wherein determining a particular weight, associated with a particular time window of the plurality of time windows, is based on:

a particular set of outputs of the first model that correspond to the particular time window, and one or more particular historical actual values, of the set of historical actual values, that correspond to the particular time window.

15. A method, comprising:

receiving a first set of outputs generated by a first model based on a set of inputs, the first set of outputs including one or more network actions and the set of inputs including one or more attributes of a wireless network;

identifying a set of historical actual values, determined by one or more sensors, that correspond to the set of inputs, wherein the first set of outputs, the set of inputs, and the historical actual values are associated with a particular time series that includes a plurality of time windows, wherein one or more particular historical actual values, one or more particular inputs, and one or more particular outputs of the first model are associated with a particular time window of the plurality of time windows;

training a second model based on:

the set of inputs to the first model, the first set of outputs of the first model, and the set of historical actual values that correspond to the set of inputs and the first set of outputs, wherein training the second model includes;

determining, for particular respective time windows of the plurality of time windows, respective measures of similarity between the first set of outputs of the first model and the set of historical actual values;

generating, by the second model, a second set of outputs based on the set of inputs; and comparing the second set of outputs to the set of inputs;

determining, based on the determined respective measures of similarity between the first set of outputs of the first model and the set of historical actual values, and further based on comparing the second set of outputs to the first set of outputs, a set of weights associated with the set of historical actual values;

refining the first model based on the set of weights associated with the set of historical actual values;

using the refined first model to determine a particular modification with respect to the wireless network based on a particular set of attributes of the wireless network; and performing the determined particular modification, determined by the refined first model, with respect to the wireless network.

16. The method of claim 15, wherein the set of inputs includes a first value that is associated with a first time window of the time series, and wherein the set of historical actual values includes at least a second value that is associated with a second time window of the time series that occurs prior.

17. The method of claim 15, wherein the set of weights is a first set of weights, the method further comprising:

determining, based on training the second model, a second set of weights associated with the set of inputs; and refining the first model further based on the second set of weights associated with the set of inputs.

18. The method of claim 15, wherein performing the determined particular modification includes modifying one or more beamforming parameters of the wireless network.

19. The method of claim 15, wherein training the second model includes determining values for the set of weights which, when applied by the second model to the set of inputs and the historical actual values, provide values that correspond to the outputs of the first model.

20. The method of claim 15, wherein the first set of outputs of the first model include one or more predicted values that are based on one or more particular inputs of the set of inputs, and wherein the historical actual values include one or more ground truth values that are associated with the one or more particular inputs of the set of inputs.

* * * * *